United States Patent
Purohit et al.

(10) Patent No.: US 10,159,016 B2
(45) Date of Patent: Dec. 18, 2018

(54) METHODS AND DEVICES FOR PERFORMING CIRCUIT-SWITCHED FALLBACK

(71) Applicant: Intel IP Corporation, Santa Clara, CA (US)

(72) Inventors: Arvind Purohit, Bangalore (IN); Parvez Sheikh, Calcutta (IN); Saikat Sengupta, Bangalore (IN)

(73) Assignee: Intel IP Corporation, Santa Clara, CA (US)

( * ) Notice: Subject to any disclaimer, the term of this patent is extended or adjusted under 35 U.S.C. 154(b) by 100 days.

(21) Appl. No.: 15/145,829

(22) Filed: May 4, 2016

(65) Prior Publication Data
US 2017/0325130 A1 Nov. 9, 2017

(51) Int. Cl.
*H04W 36/00* (2009.01)

(52) U.S. Cl.
CPC ... *H04W 36/0005* (2013.01); *H04W 36/0022* (2013.01)

(58) Field of Classification Search
CPC ......... H04W 36/0005; H04W 36/0011; H04W 36/0022
See application file for complete search history.

(56) References Cited

U.S. PATENT DOCUMENTS

| | | | | |
|---|---|---|---|---|
| 2011/0103277 A1* | 5/2011 | Watfa | ................ | H04W 36/0022 370/310 |
| 2011/0176512 A1 | 7/2011 | Sun | | |
| 2016/0127884 A1* | 5/2016 | Kim | ................ | H04W 28/0226 455/435.2 |
| 2016/0142992 A1* | 5/2016 | Chien | ................ | H04W 56/001 370/350 |

FOREIGN PATENT DOCUMENTS

EP 2228970 A1 9/2010

OTHER PUBLICATIONS

GPP TS 24.301 V13.4.0, 3rd Generation Partnership Project, Technical Specification Group Core Network and Terminals, Non-Access-Stratum (NAS) protocol for Evolved Packet System (EPS), Stage 3; Sections 5.6.2.3 and 8.2.9, Dec. 2015, pp. 175-176 and 254-255, Release 13, 3GPP, Valbonne, France.

Huawei et al., "CLI in Mobile Terminating Call Procedure", 3GPP TSG SA WG2 Meeting #65, May 12-16, 2008, pp. 1-5, TD S2-084421, Prague, Czech Republic.

(Continued)

*Primary Examiner* — Pao Sinkantarakorn
(74) *Attorney, Agent, or Firm* — Viering, Jentschura & Partner

(57) ABSTRACT

A communication circuit arrangement may include a control circuit configured to receive an initial call notification attempt in idle mode from a first network for an incoming call that originates from a second network, establish an active connection with the first network, trigger a subsequent call notification attempt from the incoming call from the first network by disregarding the initial call notification attempt, and presenting a user with caller identity information for the incoming call provided in the subsequent call notification attempt.

25 Claims, 6 Drawing Sheets

(56) References Cited

OTHER PUBLICATIONS

China Mobile, "CS Fallback Requirements", 3GPP TSG SA WG2 Meeting #63, Feb. 18-22, 2008, pp. 1-2, TD S2-081259, Athens, Greece.
Nokia Siemens Networks et al., "CLI Issues for CSFB", 3GPP TSG SA WG2 Meeting #66, Jun. 23-27, 2008, pp. 1-2, TD S2-084936, Montreal, Canada.
Telecom Italia et al., "Alignment about accepting/rejecting CSFB", 3GPP TSG-SA1 #46, Aug. 3-7, 2009, S1-093272, Rome, Italy.
TSG SA WG2, "[Draft] LS on User Call Number for CS Fallback", 3GPP TSG SA WG2 Meeting #63, Feb. 18-22, 2008, pp. 1, TD S2-081690, Athens, Greece.
3GPP, "3rd Generation Partnership Project; Technical Specification Group Services and System Aspects; Circuit Switched (CS) fallback in Evolved Packet System (EPS); Stage 2 (Release 13)", Techinical Specification, Mar. 2016, 3GPP TS 23.272, V13.3.0, 3GPP, France.
The Extended European Search Report based on Application No. 17165290.2 (15 Pages) dated Aug. 21, 2017 (Reference Purpose Only).

* cited by examiner

METHODS AND DEVICES FOR PERFORMING CIRCUIT-SWITCHED FALLBACK

TECHNICAL FIELD

Various embodiments relate generally to methods and devices for performing circuit-switched fallback (CSFB).

BACKGROUND

Long Term Evolution (LTE) has emerged as a high-speed and high-capacity radio communication standard. In contrast with predecessor legacy networks that employ a combination of circuit-switching (CS) and packet-switching (PS) for data transmission (such as e.g. GSM/EDGE, UMTS/HSPA, CDMA2000/1×EV-DO, etc.), LTE networks are all-IP networks that exclusively provide on packet-switched transmission.

Despite the improvements offered by LTE over the various legacy networks, many currently-deployed LTE networks may not yet be capable of supporting voice calls (known as Voice over LTE (VoLTE)). Accordingly, while users may enjoy the high data rates of LTE for other packet data uses (such as e.g. Internet access, application data, streaming media, etc.), mobile terminals may need to rely on circuit-switched legacy networks to support voice calls. A mobile terminal may thus need to transition, or "fall back", to a legacy circuit-switched network in order to both make and receive voice calls. Such procedures are known as Circuit-Switched Fallback (CSFB).

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
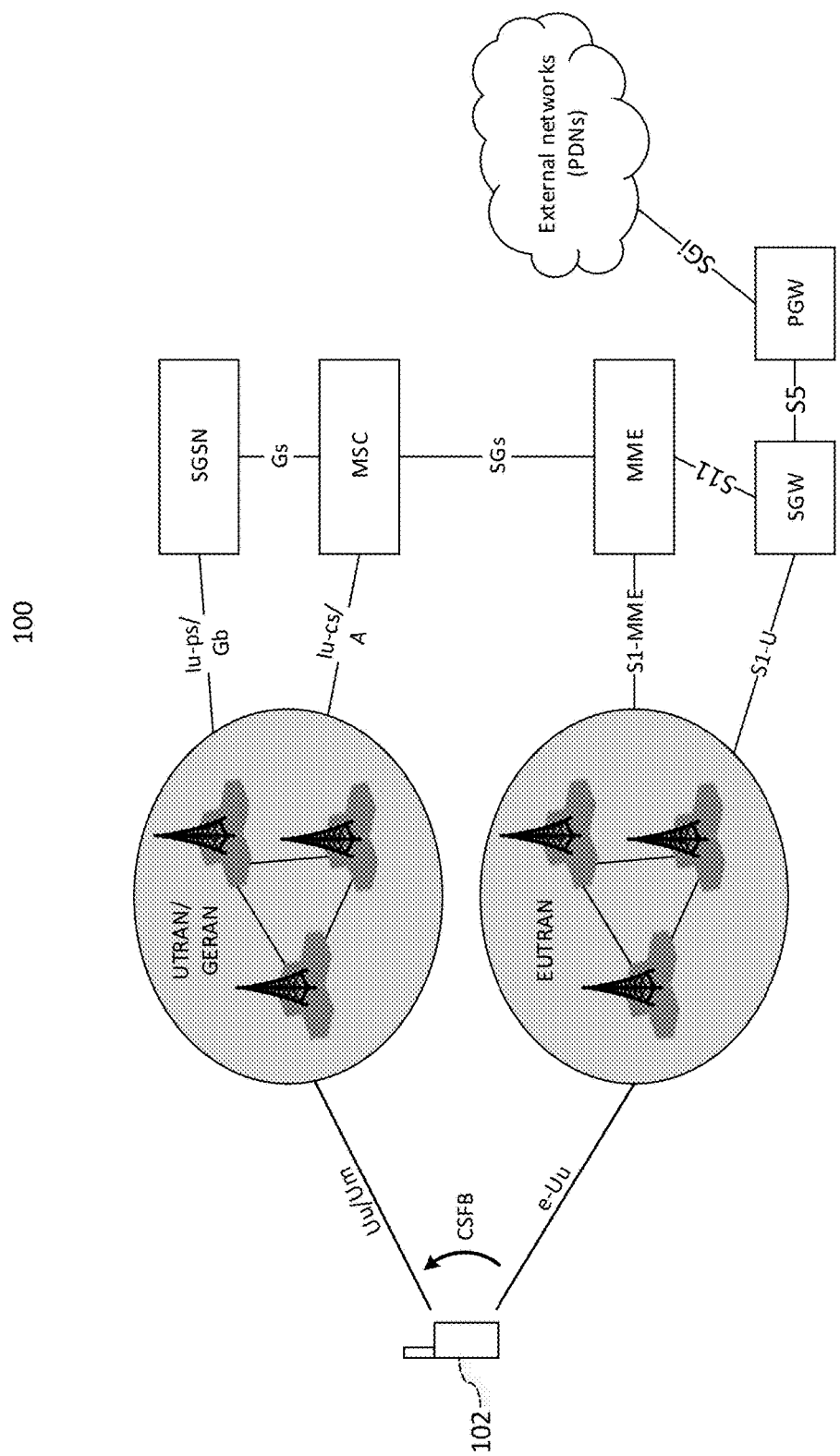
FIG. 1 shows a network diagram for a radio communication network.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, samples, symbols, elements, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "base station" used in reference to an access point of a mobile communication network may be understood as a macro base station, micro base station, Node B, evolved NodeB (eNB), Home eNodeB, Remote Radio Head (RRH), relay point, etc. As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, encompasses both an access section of a network (e.g. a radio access network (RAN) section) and a core section of a network (e.g. a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions.

In contrast to mixed circuit-switched (CS) and packet-switched (PS) legacy networks such as GSM and UMTS, LTE networks utilize an entirely packet-switched network architecture for both voice and data. While packet-switched data transfer may remain similar between LTE and the legacy networks, the transition from circuit-switched to packet-switched connections for voice calls may present a dramatic change and require significant overhaul to enable full-voice call support in LTE networks (such as the implementation of an IP Multimedia Services (IMS) framework in the LTE core network). Accordingly, LTE network operators have identified several "interim" solutions that may allow voice support for LTE-enabled mobile terminals, which may operators may employ in the near future before eventually implementing full voice support for LTE (known as VoLTE).

One such proposed interim solution is Circuit-Switched Fallback (CSFB), in which a mobile terminal that is currently connected to an LTE network may transition or 'fall back' to a circuit-switched legacy network such as GSM or UMTS to make or receive voice calls. The mobile terminal may remain on the legacy network for the duration of the voice call before ultimately transitioning back to the LTE network upon termination of the voice call. Such CSFB may accordingly allow network operators to use the legacy infrastructure to support voice calls while also allowing use of the higher-speed LTE network infrastructure for packet data transfer.

Mobile terminals may employ CSFB to both make and receive calls, i.e. for both mobile originating and mobile terminating calls. In a mobile originating call context, a mobile terminal that aims to place an outgoing call may perform fallback from an LTE network to a circuit-switched legacy network (e.g. GSM, UMTS, etc.) and subsequently initiate the outgoing call on the legacy network. In a mobile terminating call context, a mobile terminal that is actively attached to an LTE network and additionally registered with a legacy network may be the destination for an incoming call on the legacy network. Accordingly, the legacy network may inform the LTE network of the incoming call to allow the LTE network to subsequently notify the mobile terminal. The mobile terminal may then need to perform fallback to the legacy network in order to accept the call. As will be detailed, the exact procedures involved in CSFB for mobile terminating calls may vary depending on the current connection status of the mobile terminal with respect to the LTE network.

FIG. 1 shows a network diagram for radio communication network 100, which mobile terminal 102 may rely on for a variety of communication services including circuit-switched and packet-switched data transfer. As shown in FIG. 1, radio communication network 100 may include a legacy network composed of a GSM EDGE RAN (GERAN)/Universal Terrestrial RAN (UTRAN), a Serving General Packet Radio Service Support Node (SGSN) and a Mobile Switching Center (MSC), and an LTE network composed of an Evolved UMTS RAN (EUTRAN), a Mobility Management Entity (MME), a Serving Gateway (SGW), and a Packet Data Network (PDN) Gateway (PGW). Radio access network 100 may thus include both radio access components ((UTRAN/GERAN and EUTRAN) and core network components (SGSN, MSC, MME, SGW, and PGW). It is noted that the network diagram for radio communication network 100 depicted in FIG. 1 is focused on CSFB procedures and associated network entities;

accordingly, radio communication network 100 may include additional components that are not explicitly shown in FIG. 1. For example, the LTE core network including the MME, SGW, and PGW may additionally include a Home Subscriber Service (HSS) for storing subscriber information, a Policy Charging Rules Function (PCRF) server responsible for managing service and billing policies for each subscriber, and one or more additional LTE network components. Likewise, the legacy core network may additionally include a Gateway GPRS Support Node (GGSN) to interface between the SGSN and external PDNs, a Visitor Location Register (VLR) responsible for managing user information for the MSC, a Gateway MSC (GMSC) interfacing the MSC with external CS networks such as a Public Switched Telephone Network (PSTN) and/or Integrated Services Digital Network (ISDN), a Home Location Register (HLR) responsible for managing user information for the entire legacy network, and one or more additional GSM and/or UMTS network components. Furthermore, although FIG. 1 depicts the core network components of the LTE and legacy networks as single entities, radio communication network 100 may include more than one SGSN, MSC, MME, SGW, PGW, etc., where e.g. each respective component may serve mobile terminals located in a specific geographic area. The UTRAN/GERAN of radio communication network 100 is depicted collectively in FIG. 1 for simplicity, and may be composed of either one or both of a UTRAN and a GERAN. The EUTRAN may be composed of one or more eNodeBs connected via X2 interfaces while the GERAN/UTRAN may be composed of one or more Base Transceiver Stations (BTSs), Base Station Controllers (BSCs), NodeBs, and/or Radio Network Controllers (RNCs). Mobile terminal 102 may rely on such radio access nodes of radio communication network 100 as a radio interface to exchange data with internal and external components of the core network of radio communication network 100.

As previously indicated, the LTE network may provide a variety of packet data services to mobile terminal 102, such as by enabling mobile terminal 102 to access one or more external Packet Data Networks (PDNs) via the LTE network. Accordingly, mobile terminal 102 may be able to provide a user of mobile terminal 102 with a variety of data services that are available via the LTE network including basic Internet access, multimedia services (audio, video, image, text, etc.), mobile application connectivity, etc.

The MME may act as the primary control node in the LTE network, and accordingly may oversee the establishment and maintenance of such PDN connections in addition to managing the mobility of mobile terminal 102. Accordingly, mobile terminal 102 may 'attach' to the LTE network by first registering with the MME via an attach procedure. As shown in FIG. 1, mobile terminal 102 may rely on the radio interface provided by the EUTRAN in order to support a wireless connection to the MME via the EUTRAN, i.e. may utilize the wireless interface provided by the radio access section of the LTE network in order to connect to the MME located in the core network. Mobile terminal 102, the EUTRAN, and the core network components may rely on established communication protocols in order to exchange information along the various interfaces that connect each of the network components.

In order to transmit and receive user data with the external PDNs (i.e. data of interest to the user, such as the aforementioned Internet access, multimedia services, mobile application connectivity, etc.), mobile terminal 102 may need to exchange control information with both the EUTRAN and the MME, thus allowing the EUTRAN to govern data transfer over the radio interface and allowing the MME to oversee the data connection from mobile terminal 102 to both the core network and any external PDNs of interest. The radio interface between mobile terminal 102 and the EUTRAN, i.e. between mobile terminal 102 and a given serving eNodeB of the EUTRAN, may thus be governed by Access Stratum (AS, also specified as EAS in an LTE context) protocols, i.e. communication protocols that govern the radio access section of the LTE network which may include Radio Resource Control (RRC), Packet Data Convergence Protocol (PDCP), Radio Link Control (RLC), and Media Access Control (MAC). The interface between mobile terminal 102 and the MME may be governed by Non-Access Stratum (NAS) protocols, which may include Evolved Packet System (EPS) Mobility Management (EMM) and EPS Session Management (ESM).

As previously indicated, mobile terminal 102 may need to register with the MME via an initial attach procedure with the network. Upon registration with the MME, mobile terminal 102 may transition from an EMM-DEREGISTERED (i.e. not registered with the MME) to an EMM-REGISTERED state (i.e. registered with the MME). The MME may then establish a default PDN connection to a PDN (e.g. a default PDN providing Internet access) for mobile terminal 102 via the SGW and PGW (both of which the MME may select). The MME may then continuously oversee the maintenance of the PDN connections of mobile terminal 102 as part of the ESM NAS protocols and monitor the mobility of mobile terminal 102 as part of the EMM NAS protocols.

Mobile terminal 102 may either have an active or idle connection over the radio access and core network, which may depend on the current level of network activity of mobile terminal 102. For example, mobile terminal 102 be in a connected state in which mobile terminal 102 is allocated dedicated radio resources, i.e. RRC-CONNECTED (over the e-Uu interface between mobile terminal 102 and one or more eNodeBs of the EUTRAN), and dedicated core network resources, i.e. EMM-CONNECTED (over the S1-MME interface), and accordingly may have an active NAS signaling connection with the MME via the e-Uu and the S1-MME (which as later detailed may be important for CSFB purposes). Mobile terminal 102 may enter into such a connected state (RRC-CONNECTED and EMM-CONNECTED) in order to actively exchange user data, such as to provide Internet access or other packet data to a user of mobile terminal 100.

Conversely, if mobile terminal 102 does not have an active data connection, mobile terminal 102 may be in an idle state (RRC-IDLE and EMM-IDLE). In such an idle state, mobile terminal 102 may not be allocated any dedicated radio or core network resources. While mobile terminal 102 may remain registered with the MME and maintain at least one PDN connection (e.g. a default PDN connection allowing for always-on connectivity, albeit in an inactive state with no active data transfer), mobile terminal 102 may only receive periodic paging messages from the EUTRAN which may alert mobile terminal 102 of any incoming data activity intended for mobile terminal 102. Such paging may be triggered by the MME, which may request one or more eNodeBs of the EUTRAN to broadcast paging messages intended for mobile terminal 102. In order to select eNodeBs proximate to mobile terminal 102 for paging, MME may track the location of mobile terminal 102. Specifically, mobile terminal 102 may be required to transmit location updates in the form of Tracking Area Updates (TAUs) to the MME, which may specify the Tracking Area (TA) in which mobile terminal 102 is currently located. The MME may thus track the location of mobile terminal 102 on a per-TA basis while mobile terminal 102 is in idle mode, and accordingly may signal the eNodeBs associated with the last TA reported by mobile terminal 102 to provide paging services intended for mobile terminal 102.

Returning to a CSFB context, mobile terminal 102 may register with the MME during an attach procedure to the LTE network, which may enable mobile terminal 102 to subsequently enter into a connected state (EMM-CONNECTED and RRC-CONNECTED) and actively exchange data on the LTE network. However, as previously indicated the LTE network may not be able to support voice calls (e.g. VoLTE is not supported or not currently available), which may constrain mobile terminal 102 to rely on the legacy network for voice calls. Mobile terminal 102 may thus additionally need to register with the MSC of the legacy network, which may be responsible for routing voice calls within the legacy network and may thus need to be aware of current location information for mobile terminal 102 in order to properly route voice calls to mobile terminal 102.

Mobile terminal 102 may therefore utilize combined attach and combined Tracking Area Update (TAU) procedures to register with both the MME and the MSC. More specifically, mobile terminal 102 may initially register with both the MME and the MSC with a combined EPS/International Mobile Subscriber Identity (IMSI) attach procedure and may periodically update the registration with the MME and the MSC throughout the lifetime of the connection with combined TAU procedures.

In a combined attach procedure (e.g. combined EPS/IMSI attach), mobile terminal 102 may first register with the MME which may then proceed to register mobile terminal 102 with the MSC via the SGs interface. The MME may provide the MSC with location information for mobile terminal 102, such as by converting the TA for the LTE network reported by mobile terminal 102 to a Location Area (LA) for the legacy network. As indicated above, mobile terminal 102 may periodically transmit TAUs to the MME in order to allow the MME to track the location of mobile terminal 102. In order to ensure that the MSC is also able to monitor the location of mobile terminal 102, mobile terminal 102 may transmit the TAUs as combined TAUs, (e.g. by indicating in an Information Element (IE) of the TAU that the TAU is a combined TAU) which may prompt the MME to report the location of mobile terminal 102 to MSC, such as e.g. by determining the corresponding LA for the TA reported in each TAU and reporting such to the MSC. The MSC may thus be able to track the location of mobile terminal 102 via updates provided by the MME in anticipation of subsequent CS call routing.

In a CSFB mobile terminating call context, the MSC may receive an indication that an incoming CS call is intended for mobile terminal 102, where the incoming call may originate either internally (e.g. from another mobile terminal of the legacy network) or externally to the legacy network (e.g. from a mobile terminal of another cellular network or from the PSTN). As previously indicated, mobile terminal 102 may need to switch to the legacy network in order to receive the incoming call, i.e. may need to perform CSFB to transition from the LTE network to the legacy network. Accordingly, the MSC may notify the MME via the SGs interface of the incoming call. The MME may then be tasked with notifying mobile terminal 102 of the incoming call in order to allow mobile terminal 102 to perform CSFB and receive the incoming call on the legacy network.

As previously indicated, mobile terminal 102 may either have an active connection with the MME (EMM-CONNECTED) or may not have an active connection with the MME (EMM-IDLE). In the EMM-CONNECTED state, mobile terminal 102 may be able to actively exchange NAS signaling with the MME (via the NAS signaling connection realized over the S1-MME and e-Uu interfaces), which may consequently allow mobile terminal 102 and the MME to exchange detailed control signaling with one another via the established connection. Conversely, if mobile terminal 102 is in an EMM-IDLE state and does not have an active connection to the MME, the MME may not be able to directly exchange NAS signaling with mobile terminal 102 and may instead be limited to requesting paging from the lower layers (e.g. the AS RRC layer of the EUTRAN) in order to notify mobile terminal 102 of the incoming call.

This ability of the MME to directly exchange NAS signaling with mobile terminal 102 in EMM-CONNECTED may provide a substantial benefit during CSFB procedures. As will be detailed, if mobile terminal 102 is in connected mode the MME may be able to provide mobile terminal 102 with caller identity information for the incoming call, which may allow mobile terminal 102 to present the incoming call (accompanied by the caller identity information received from the MME) to a user for acceptance or denial of the incoming call prior to performing CSFB. In contrast, if mobile terminal 102 is in idle mode the MME may not be able to provide caller identity information to mobile terminal 102, and accordingly mobile terminal 102 may need to first perform CSFB and subsequently receive the caller identity information from the legacy network. The user may ultimately reject the incoming call, and as a result mobile terminal 102 may have unnecessarily performed CSFB only to have the user reject the call.

More specifically, as specified by 3GPP in Sections 5.6.2.3 and Sections 8.2.9 of 3GPP TS 24.301, V13.4.0 (2015), "Non-Access-Stratum (NAS) protocol for Evolved Packet System (EPS)", if mobile terminal 102 is in connected mode the MME may be able to utilize the active NAS signaling connection with mobile terminal 102 to transmit a CS Service Notification message that notifies mobile terminal 102 of the incoming call on the legacy network in addition to specifying detailed information about the incoming call, such as caller identity information in the form of Calling Line Identification (CLI) in addition to supplementary service (SS) codes, location services (LS) parameters, etc. Consequently, mobile terminal 102 may be able to identify the caller of the incoming call based on the caller identity information specified as CLI in the CS Service Notification message received from the MME. Accordingly, mobile terminal 102 may be able to present the incoming call to a user of mobile terminal 102 along with the caller identity information specified in the CS Service Notification message to allow the user to accept or reject the incoming call (via a user I/O interface of mobile terminal 102). If the user accepts the incoming call, mobile terminal 102 may respond to the CS Service Notification message by transmitting an affirmative Extended Service Request (ESR) to the MME that indicates acceptance of the incoming call, thus triggering CSFB procedures. Mobile terminal 102 may transmit an affirmative ESR by transmitting an ESR with the "CSFB response" IE of the ESR set to "CS fallback accepted by the UE". Conversely, if the user rejects the incoming call, mobile terminal 102 may respond to the CS Service Notification message by transmitting a negative Extended Service Request to the MME that indicates rejection of the incoming call. Mobile terminal 102 may transmit a negative ESR by transmitting an ESR with the "CSFB response" IE set to "CS fallback rejected by the UE". Accordingly, mobile terminal 102 may forego CSFB and maintain the active LTE connection if the user rejects the incoming call.

Reception of a CS Service Notification message may thus be considerably advantageous as mobile terminal 102 may be able to present the user with a choice to accept or reject the incoming call based on the caller identity information specified in the CS Service Notification message prior to initiating CSFB. Accordingly, mobile terminal 102 may be able to wait until the user has actually accepted the call to initiate CSFB procedures, and thus may maintain the active LTE connection in an uninterrupted fashion if the user rejects the incoming call.

In contrast, if mobile terminal 102 is in an EMM-IDLE state and thus does not have an active NAS signaling connection with the MME, the MME may need to rely on paging mobile terminal 102 via lower layers at the EUTRAN, i.e. may need to rely on lower layers such as the RRC of the AS. In contrast to the CS Service Notification messages available via an active NAS signaling connection, the MME may only be able to request paging services from one or more eNodeBs, and may not be able to provide any information such as caller identity information to mobile terminal 102 via the paging process (as such may be handled by lower layers such as the RRC of the AS).

As a result, the EUTRAN may page mobile terminal 102 by broadcasting paging messages from one or more eNodeBs associated with the TA indicated by mobile terminal 102 in the most recent TAU. Such paging messages may only contain limited information, such as an identifier for mobile terminal 102 (that identifies that the paging message is for mobile terminal 102) and an identifier that specifies that the paging message is related to the CS domain (i.e. is related to circuit-switched services). Accordingly, mobile terminal 102 may not be able to obtain any caller identity information from the paging message, and as a result may not be able to present the user with the option to accept or reject the incoming call.

Mobile terminal 102 may therefore not be able to receive caller identity information for the incoming call until after performing CSFB and receiving the caller identity information from the legacy network. Mobile terminal 102 may not have the benefit of deferring CSFB until the user has accepted in the incoming call, and consequently may need to 'blindly' perform CSFB upon receiving a paging message that indicates the CS domain. Following CSFB, mobile terminal 102 may be able to obtain the caller identity information from the legacy network and present the call to the user for acceptance or rejection of the call. Consequently, if the user rejects the call, mobile terminal 102 may have essentially performed CSFB to no advantage (as the circuit-switched call will be rejected) and may thus be left connected to the legacy network instead of the preferred LTE network. As many deployed LTE networks may not have concrete mechanisms to quickly transfer back to the LTE network, mobile terminal 102 may be left on the legacy network for an appreciable duration of time, which may hinder data transfer due to the lower data speeds of the legacy network.

Mobile terminals that are in idle mode (RRC-IDLE and EMM-IDLE) upon being notified of an incoming CS call may thus suffer from the requirement that they blindly perform CSFB upon receipt of a paging message for the incoming CS call. As detailed above, mobile terminals in connected mode (RRC-CONNECTED and EMM-CONNECTED) may not be exposed to the same problems, as such mobile terminals may be able to receive detailed NAS signaling messages that include caller identity information from the MME and subsequently present the caller identity information for the incoming call to the user and wait for an affirmative response from the user before performing CSFB.

In order to avoid performing unnecessary CSFB in such scenarios, mobile terminal 102 may utilize an alternate procedure upon receiving a paging message for an incoming CS call that may allow mobile terminal 102 to receive caller identity information without first performing CSFB. Specifically, upon receipt in idle mode of a paging message for an incoming CS call, mobile terminal 102 may disregard (or "ignore") the paging message (e.g. may not send any ESR to the MME) and separately enter into connected mode (RRC-CONNECTED and EMM-CONNECTED) with the LTE network, thus establishing an active NAS signaling connection with the MME. As mobile terminal 102 did not respond to the paging request by transmitting an affirmative/negative ESR, the MME may re-ry to contact mobile terminal 102 (e.g. if mobile terminal 102 does not respond to the paging message within a certain duration of time). As mobile terminal 102 has now entered into connected mode, the MME may recognize that mobile terminal 102 is in connected mode and thus has an active NAS signaling connection with the MME. Accordingly, instead of re-attempting to page mobile terminal 102, the MME may instead utilize the NAS signaling connection to transmit a CS Service Notification message to mobile terminal 102, which as previously detailed may allow the MME to include caller identity information in the form of CLI (in addition to further information for the incoming call).

Mobile terminal 102 may thus present the incoming call to the user with the caller identity information to allow the user to accept or reject the incoming call, and may accordingly obtain the caller identity information without having to first perform CSFB. As a result, mobile terminal 102 may only perform CSFB if the user accepts the call, and may thus remain connected to the LTE network if the user rejects the incoming call. Mobile terminal 102 may consequently avoid unnecessarily performing CSFB, which as previously detailed may occur if a mobile terminal blindly performs CSFB upon receiving a paging message for an incoming CS call only to have the user ultimately reject to answer the call. By disregarding the paging message and instead entering into connected mode and receiving a CS Service Notification, message, mobile terminal 102 may be able to present the caller identity information included in the CS Service Notification message to the user and ultimately only perform CSFB if the user accepts the incoming call. Mobile terminal 102 may thus be able to avoid unnecessarily switching to the legacy network, and may thus allow the user to continue to enjoy the high-data rates of the preferred LTE network over the non-preferred legacy network.

Figure 2:
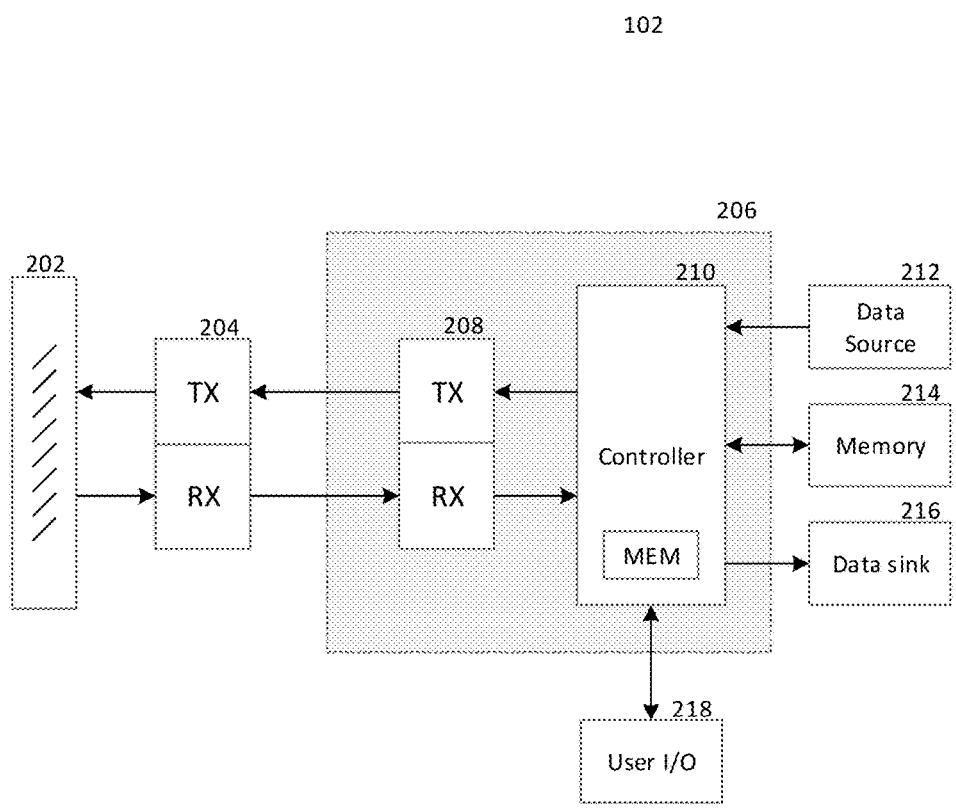
FIG. 2 shows an internal configuration radio communication device.

FIG. 2 shows an internal configuration of mobile terminal 102. As shown in FIG. 2, mobile terminal 102 may include antenna system 202, radio frequency (RF) transceiver 204, baseband modem 206 (including physical layer processing circuit 208 and controller 210), data source 212, memory 214, data sink 216, and user I/O 218. Although not explicitly shown in FIG. 2, mobile terminal 102 may include one or more additional hardware, software, and/or firmware components (such as processors/microprocessors, controllers/microcontrollers, other specialty or generic hardware/processors/circuits, etc.), peripheral device(s), memory, power supply, external device interface(s), subscriber identify module(s) (SIMs), etc.

In abridged operational overview, mobile terminal 102 may transmit and receive radio signals on one or more radio access networks. Baseband modem 206 may direct such communication functionality of mobile terminal 102 according to the communication protocols associated with each radio access network, and may execute control over antenna system 202 and RF transceiver 204 in order to transmit and receive radio signals according to the formatting and scheduling parameters defined by each communication protocol.

Mobile terminal 102 may transmit and receive radio signals with antenna system 202, which may be a single antenna or an antenna array composed of multiple antennas and may additionally include analog antenna combination and/or beamforming circuitry. In the receive path (RX), RF transceiver 204/RX may receive analog radio frequency signals from antenna system 202 and perform analog and digital RF front-end processing on the analog radio frequency signals to produce digital baseband samples (e.g. In-Phase/Quadrature (IQ) samples) to provide to baseband modem 204. RF transceiver 204/RX may accordingly include analog and digital reception circuitry including amplifiers (e.g. a Low Noise Amplifier (LNA), filters, RF demodulators (e.g. an RF IQ demodulator)), and analog-to-digital converters (ADCs) to convert the received radio frequency signals to digital baseband samples. In the transmit path (TX), RF transceiver 204/TX may receive digital baseband samples from baseband modem 206 and perform analog and digital RF front-end processing on the digital baseband samples to produce analog radio frequency signals to provide to antenna system 202 for wireless transmission. RF transceiver 204/TX may thus include analog and digital transmission circuitry including amplifiers (e.g. a Power Amplifier (PA), filters, RF modulators (e.g. an RF IQ modulator), and digital-to-analog converters (DACs) to mix the digital baseband samples received from baseband modem 206 to produce the analog radio frequency signals for wireless transmission by antenna system 202.

As shown in FIG. 2, baseband modem 206 may include physical layer processing circuit 208, which may perform physical layer (Layer 1) transmission and reception processing to prepare outgoing transmit data provided by controller 210 for transmission via RF transceiver 204/TX and prepare incoming received data provided by RF transceiver 204/RX for processing by controller 210. Physical layer processing circuit 208 may accordingly perform one or more of error detection, forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, etc. Physical layer processing circuit 208 may be structurally realized as hardware logic, e.g. as an integrated circuit or FPGA, as software logic, e.g. as program code defining arithmetic, control, and I/O instructions stored in a non-transitory computer-readable storage medium and executed on a processor, or as a combination of hardware and software logic. Although not explicitly shown in FIG. 2, physical layer processing circuit 208 may include a control circuit such as a processor configured to control the various hardware and software processing components of physical layer processing circuit 208 in accordance with physical layer control logic defined by the communications protocol for the relevant radio access technologies.

Mobile terminal 102 may be configured to operate according to one or more radio access technologies, which may be directed by controller 210. Controller 210 may thus be responsible for controlling the radio communication components of mobile terminal 102 (antenna system 202, RF transceiver 204, and physical layer processing circuit 208) in accordance with the communication protocols of each supported radio access technology, and accordingly may represent Layer 2 and Layer 3 of each supported radio access technology. Controller 210 may be structurally embodied as a protocol processor configured to execute protocol software (retrieved from controller memory MEM as shown in FIG. 2) and subsequently control the radio communication components of mobile terminal 102 in order to transmit and receive communication signals in accordance with the corresponding protocol control logic defined in the protocol software.

Controller 210 may therefore be configured to manage the radio communication functionality of mobile terminal 102 in order to communicate with the various radio and core network components of radio communication network 100, and accordingly may be configured according to the communication protocols for both the LTE network and the GSM/UMTS legacy network. Controller 210 may either be a unified controller that is collectively responsible for all supported radio access technologies (e.g. LTE and GSM/UMTS) or may be composed of multiple separate controllers where each controller is a dedicated controller for a particular radio access technology, such as e.g. a dedicated LTE controller and a dedicated legacy controller (or alternatively a dedicated LTE controller, dedicated GSM controller, and a dedicated UMTS controller). Regardless, controller 210 may be responsible for directing radio communication activity of mobile terminal 102 according to the communication protocols of the LTE and legacy networks. One or more of antenna system 202, RF transceiver 204, and physical layer processing circuit 208 may be similarly partitioned into multiple dedicated components each corresponding to one or more of the supported radio access technologies. Depending on the specifics of each such configuration and the number of supported radio access technologies, controller 210 may be configured to control the radio communication operations of mobile terminal 102 in accordance with a master/slave RAT hierarchical or multi-SIM scheme.

Mobile terminal 102 may further comprise data source 212, memory 214, data sink 216, and user I/O 218, where data source 212 may include sources of communication data above controller 210 (i.e. above Layer 3) and data sink 212 may include destinations of communication data above controller 210 (i.e. above Layer 3). Such may include, for example, an application processor of mobile terminal 102, which may be configured to execute various applications and/or programs of mobile terminal 102, such as e.g. an Operating System (OS), a User Interface (UI) for supporting user interaction with mobile terminal 102, and/or various user applications. The application processor may interface with baseband modem 206 (as data source 212/data sink 216) as an application layer to transmit and receive user data such as voice data, audio/video/image data, messaging data, application data, basic Internet/web access data, etc., over a the radio network connection(s) provided by baseband modem 206.

Memory 214 may comprise a memory component of mobile terminal 102, such as e.g. a hard drive or another such permanent memory device. Although not explicitly depicted in FIG. 2, the various other components of mobile terminal 102 shown in FIG. 2 may additionally each include integrated permanent and non-permanent memory components, such as for storing software program code, buffering data, etc. User I/O 218 may include represent various user input/output devices of mobile terminal 102, such as display(s), keypad(s), touchscreen(s), speaker(s), external button(s), camera(s), microphone(s), etc., and may provide an interface for a user to interact with mobile terminal 102.

As previously indicated, mobile terminal 102 may be configured to implement specific procedures upon receipt of a CS paging message in order to ensure reception of caller identity information and avoid the potential for unnecessary CSFB procedures (e.g. if a user ultimately rejects the incoming call based on the caller identity information). Specifically, mobile terminal 102 may disregard an initial paging message from the LTE network that indicates an incoming CS call (i.e. may not transmit an ESR to the MME in response to the paging message) and may instead separately enter into connected mode with the LTE network. As mobile terminal 102 may now have an active connection with the MME, the MME may re-try to notify mobile terminal 102 of the incoming call and may recognize that mobile terminal 102 is now actively connected to the MME, i.e. has an active NAS signaling connection. Accordingly, the MME may perform the re-attempt by transmitting a CS Service Notification message via the NAS signaling connection to mobile terminal 102 that includes caller identity information in the form of CLI. Mobile terminal 102 may therefore be able to present the incoming call to the user with the caller identity information and only perform CSFB if the user affirmatively accepts the incoming call, and may thus avoid unnecessary CSFB scenarios in which blind CSFB is followed by rejection of the incoming call by the user.

As controller 210 may be responsible for radio communication functionality, controller 210 may control the interaction of mobile terminal 102 with the LTE network, which may include the NAS-layer protocols involved with communicating with the MME and the evolved AS (EAS)-layer protocols (i.e.) involved with communicating with the eNodeBs of the EUTRAN. Controller 210 may additionally control the interaction of mobile terminal 210 with the legacy network, which may include the AS- and NAS-layer protocols involved in communicating with the GERAN/UTRAN and the core network components such as the MSC.

Figure 3:
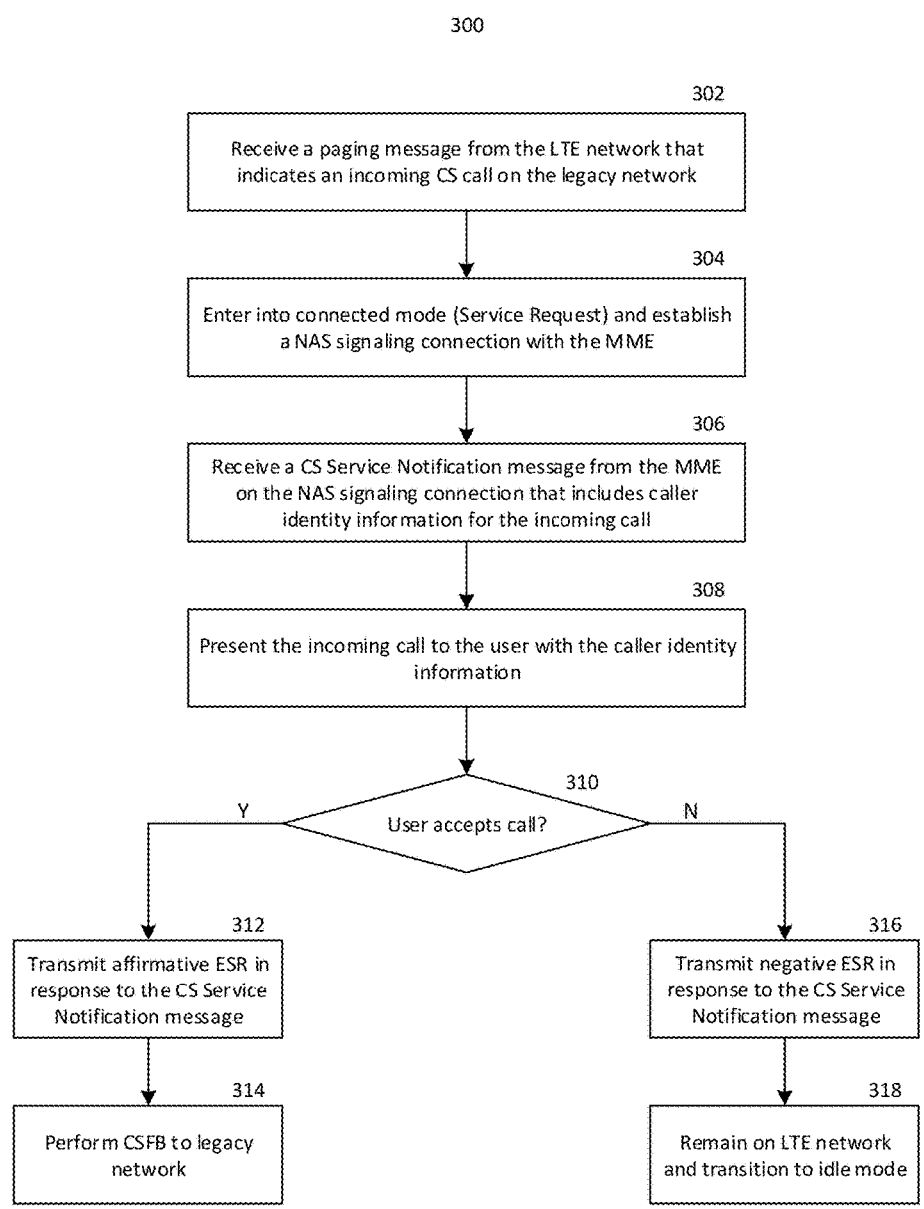
FIG. 3 shows a method for performing CSFB starting from an idle state.
Figure 4:
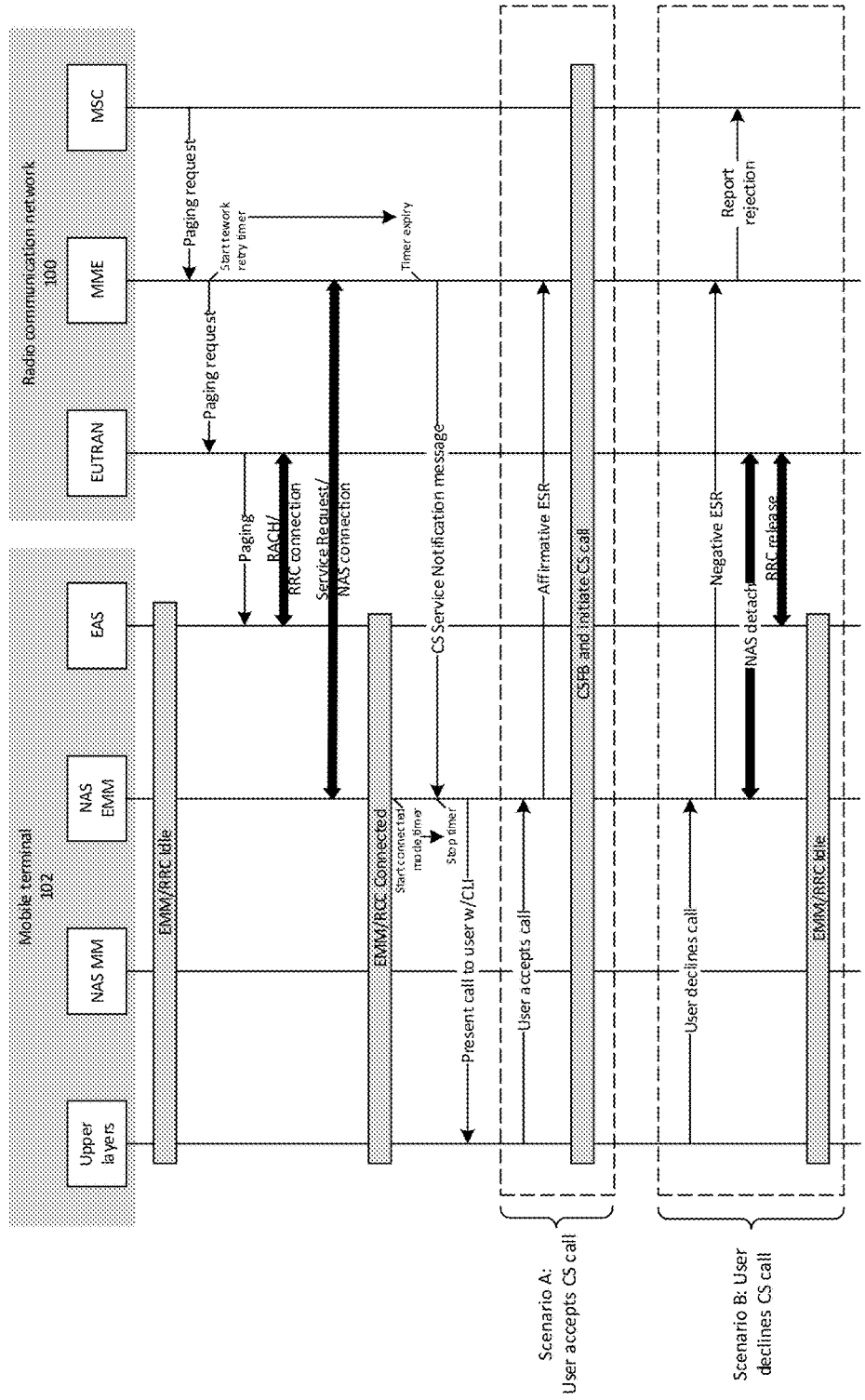
FIG. 4 shows a message sequence chart counterpart to the method of FIG. 3.

FIG. 3 depicts flow chart 300 that illustrates the CSFB procedure that controller 210 may execute when starting from an idle state (EMM-IDLE and RRC-IDLE). FIG. 4 depicts a counterpart message sequence chart that illustrates the signaling between the various network elements and protocol entities of mobile terminal 102 related to the CSFB procedure.

As shown in FIG. 4, mobile terminal 102 may initially reside in an idle state (EMM-IDLE and RRC-IDLE) and may be registered with both the LTE network (at the MME) and the legacy network (at the MSC). The MSC may first receive notification of an incoming CS call intended for mobile terminal 102, which may either originate internally at the MSC (e.g. from another mobile terminal attached to the MSC) or externally from the MSC (e.g. from a mobile terminal attached to another MSC of the legacy network, a mobile terminal attached to another MSC of another legacy network, or from the PSTN). As mobile terminal 102 is registered at the MSC via the MME (i.e. via a combined attach procedure (e.g. combined EPS/IMSI attach) and subsequent combined location update procedures (e.g. combined TAUs)), the MSC may identify the MME as the appropriate routing point and provide the MME with a paging request that indicates the presence of an incoming call intended for mobile terminal 102.

As mobile terminal 102 is in an idle state, mobile terminal 102 may not have an active NAS signaling connection with the MME. Accordingly, the MME may not be able to directly communicate with mobile terminal 102, and thus may not be able to transmit a CS Service Notification message to mobile terminal 102. The MME may thus need to rely on paging to notify mobile terminal 102, and accordingly may request paging services from the EUTRAN (i.e. the RRC entity of the EAS) in order to notify mobile terminal 102 of the incoming call. Specifically, the MME may request paging services from one or more eNodeBs (e.g. via S1-AP signaling on the S1-MME interface) of the EUTRAN that correspond to the TA reported by mobile terminal 102 in the most recent TAU.

The MME may additionally start a network retry timer after sending the paging request to the EUTRAN, which may run until either the MME receives an Extended Service Request from mobile terminal 102 or until the network retry timer expires (which may be a configurable duration). The MME may utilize the network retry timer to direct retries, and consequently may re-try to notify mobile terminal 102 of the incoming call upon expiry of the network retry timer (as further detailed below).

The selected eNodeBs may then attempt to page mobile terminal 102 (at the RRC layer of the EAS), and accordingly may transmit a paging message during a paging occasion assigned to mobile terminal 102. Controller 210 may receive the paging message at 302 (following reception and lower-layer processing by antenna system 202, RF transceiver 204, and physical layer processing circuit 208) as an RRC-layer message at the EAS. Controller 210 may then determine from the paging message that a CS service is pending on the legacy network (e.g. via a CN domain indicator in the paging message that specifies the CS domain).

Instead of responding to the paging message with an Extended Service Request, controller 210 may instead disregard the paging message and separately transition mobile terminal 102 to a connected state in 304. Accordingly, controller 210 may perform random access and RRC connection establishment procedures (at the EAS, e.g. in accordance with 3GPP protocols) followed by NAS connection procedures in 304 in order to enter a connected state (EMM-CONNECTED and RRC-CONNECTED). Instead of sending an ESR, controller 210 may instead transmit a Service Request to the MME over the NAS signaling connection. As shown in FIG. 4, controller 210 may additionally start a connected mode timer upon entering connected state, which controller 210 may employ in order to ensure that the controller 210 transitions back to idle state if no CS Service Notification message is received (e.g. if the call originating user ends the call before the MME performs the re-try).

As previously indicated, the MME may start a network retry timer upon sending the paging request to the EUTRAN. As controller 210 disregarded the paging message (i.e. did not respond with an Extended Service Request), the network retry timer may eventually expire according to the network retry timer duration. The MME may then re-try to notify mobile terminal 102 of the incoming call. As mobile terminal 102 has previously entered into a connected state, the MME may recognize that mobile terminal 102 is now connected and thus has an active NAS signaling connection with the MME. The MME may therefore transmit a CS Service Notification message that indicates the incoming call to mobile terminal 102 over the now-active NAS signaling connection.

Controller 210 may thus receive the CS Service Notification message (at the NAS EMM) at 306. As previously detailed, the CS Service Notification message may include important information about the incoming call, including caller identity information (as CLI), SS codes, LS parameters, etc. Controller 210 may thus be able to obtain the caller identity information on the incoming call from the CS Service Notification message. Mobile terminal 102 may therefore avoid having to blindly perform CSFB when starting from an idle mode, as mobile terminal 102 may disregard the paging message (i.e. not transmit an ESR to the MME in response to the paging message) and instead separately enter into connected mode to receive a CS Service Notification message from the MME for a subsequent re-try by the MME (i.e. upon expiry of a network retry timer). Controller 210 may also stop the connected mode timer upon receive of the CS Service Notification message.

As controller 210 may now have the caller identity information, controller 210 may be able to present the incoming call to the user (without first performing CSFB) in 308 along with the caller identity information to allow the user to accept or reject the incoming call. Controller 210 may rely on upper layers to present the incoming call to the user, which may include user I/O 218 and/or an application processor of mobile terminal 102 such as e.g. by graphically displaying the incoming call along with caller identity information on a display screen of user I/O 218 and receiving input from the user via e.g. touchscreen or button input of user I/O 218 that specifies whether the user accepted or rejected the incoming call. As shown in FIG. 4, the upper layers may indicate the user input to controller 210 (at the NAS EMM) that specifies whether the user has accepted or rejected the call.

Controller 210 may thus determine in 310 whether the user accepted or rejected the incoming call and proceed to transmit either an affirmative or negative ESR to the MME in response to the CS Service Notification in 312 or 316. If the user accepts the incoming call (Scenario A in FIG. 4), controller 210 may transmit an affirmative ESR (e.g. an ESR with the "CSFB response" IE set to "CSFB fallback accepted) to the MME in response to the CS Service Notification message in 312. Controller 210 may then perform CSFB to the legacy network in 314 in order to accept the incoming call. Controller 210 may perform such CSFB in accordance with established 3GPP procedures, which may be directed by the MME and include performing a handover or a redirect to the legacy network (potentially based on radio measurements to select an appropriate legacy cell). Controller 210 may thus direct the operations of mobile terminal 102 in order to accept and carry out the CSFB call on the legacy network, i.e. at the NAS MM (legacy NAS) at controller 210.

Alternatively, the user may reject the call (Scenario B in FIG. 4), which may include either actively rejecting the call with user I/O 218 or failing to accept the call within a certain duration of time. Controller 210 may thus determine in 310 that the user has rejected the call and proceed to transmit a negative ESR (e.g. an ESR with the "CSFB response" IE set to "CSFB fallback rejected") to the MME in response to the CS Service Notification message in 316. The MME may then report the rejection to the MSC in order to notify the legacy network that the user has rejected the call. As CSFB is consequently not necessary, controller 210 may remain on the LTE network in 318.

As controller 210 transitioned to connected mode in 304 for the sole purpose of receiving a subsequent CS Service Notification message, controller 210 may transition back to idle mode if the user rejects the call. As connected mode generally requires greater power expenditure than idle mode, the transition back to idle mode may allow mobile terminal 102 to conserve battery power. Accordingly, as shown in flow chart 300 and FIG. 4, controller 210 may transition tear down the NAS and RRC connections with the MME and EUTRAN, respectively, and return to an EMM-IDLE and RRC-IDLE state after the user has rejected the call. It is noted that controller 210 may remain in connected state if the user has separately triggered data activity that requires connected mode.

Controller 210 may additionally need to consider a scenario in which the MME does not transmit the CS Service Notification message, such as e.g. if the originating user of the incoming call terminates the call before the MME transmits the CS Service Notification message (e.g. when the network retry timer expires). For example, the originating user may hang up the call, which the MSC may indicate to the MME via the SGs interface. If the MME receives such indication prior to transmitting the CS Service Notification message (and after transmitting the paging request to the EUTRAN), the MME may not transmit the CS Service Notification message and may terminate CSFB procedures related to the incoming call. Accordingly, controller 210 may not receive the CS Service Notification message for the incoming call, and may be left suspended in connected mode. In order to avoid being suspended in connected mode (which may have a higher power penalty), as previously introduced controller 210 may initiate the connected mode timer (at the NAS EMM) upon entering connected mode in 304. If the connected mode timer expires, controller 210 may assume that the call has been terminated, and may trigger the transition into idle mode to tear down the NAS and RRC connections. The connected mode timer duration may be slightly longer than the network retry timer, which may allow controller 210 to ensure that the incoming call has been terminated before triggering the transition to idle mode.

Accordingly, by implementing the CSFB procedure of flow chart 300 mobile terminal 102 may avoid having to blindly perform CSFB when starting from an idle state. As detailed above, mobile terminal 102 may disregard a paging message for an incoming CS call (i.e. not transmit an ESR to the MME in response to the paging message) and separately enter into connected mode (i.e. by transmitting an SR to the MME) to establish an active NAS signaling connection with the MME. When the MME re-tries to notify mobile terminal 102 of the incoming CS call, the MME may recognize that mobile terminal 102 is now in connected mode and may transmit a CS Service Notification message to mobile terminal 102 over the now-active NAS signaling connection instead of triggering another paging procedure.

Such may thus allow mobile terminal 102 to receive the CS Service Notification message and obtain caller identity information for the incoming call. Mobile terminal 102 may then present the incoming call to the user with the caller identity information to allow the user to accept or reject the incoming call. Mobile terminal 102 may thus only perform CSFB if the user accepts the incoming call, and accordingly may avoid performing unnecessary CSFB. Mobile terminal 102 may as a result potentially avoid having to transfer active data transfers on the LTE network to the legacy network (which may be disruptive and yield slower data speeds) and avoid having to remain on the legacy network for an extended period of time, thus improving user experience.

As detailed above regarding FIGS. 3 and 4, controller 210 may be responsible for directing the CSFB procedure of flow chart 300 (at the EAS, LTE NAS (EMM), and legacy NAS (MM), in addition to receiving input from the upper layers) in order to control the radio functionality of mobile terminal 102. Controller 210 may thus operate according to corresponding control logic defined as software code stored in controller memory MEM, which controller 210 may retrieve and execute. The functionality of controller 210 detailed herein may thus be embodied as computer readable instructions or code and stored in a non-transitory computer readable medium (e.g. MEM) for execution by controller 210.

Figure 5:
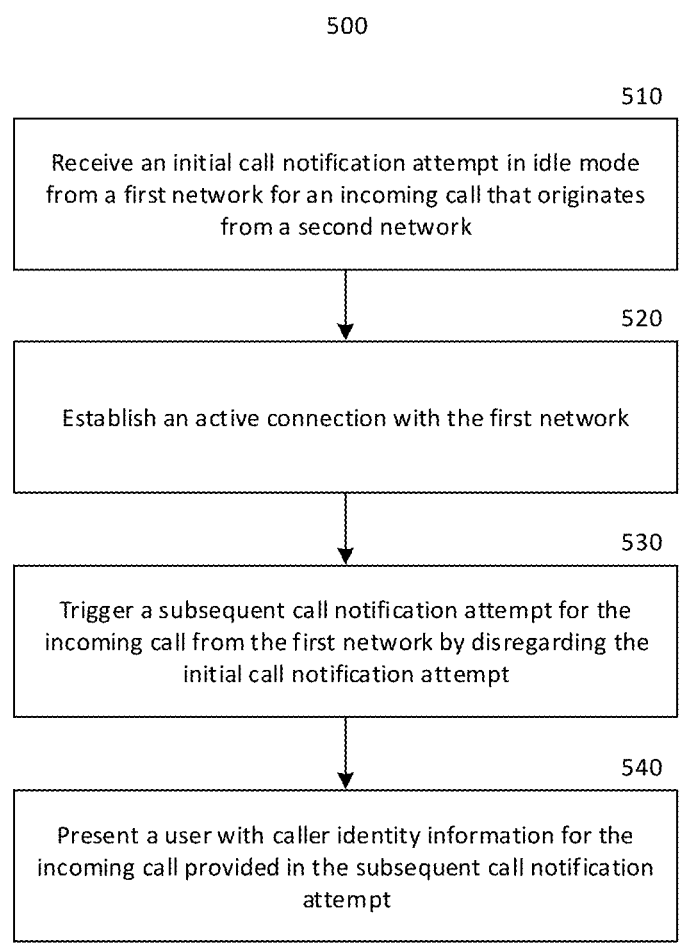
FIG. 5 shows a first method of performing radio communications.

FIG. 5 shows method 500 for performing radio communications in accordance with this disclosure. As shown in FIG. 5, method 500 includes receiving an initial call notification attempt in idle mode from a first network for an incoming call that originates from a second network (510), establishing an active connection with the first network (520), triggering a subsequent call notification attempt for the incoming call from the first network by disregarding the initial call notification attempt (530), and presenting a user with caller identity information for the incoming call provided in the subsequent call notification attempt (540).

Figure 6:
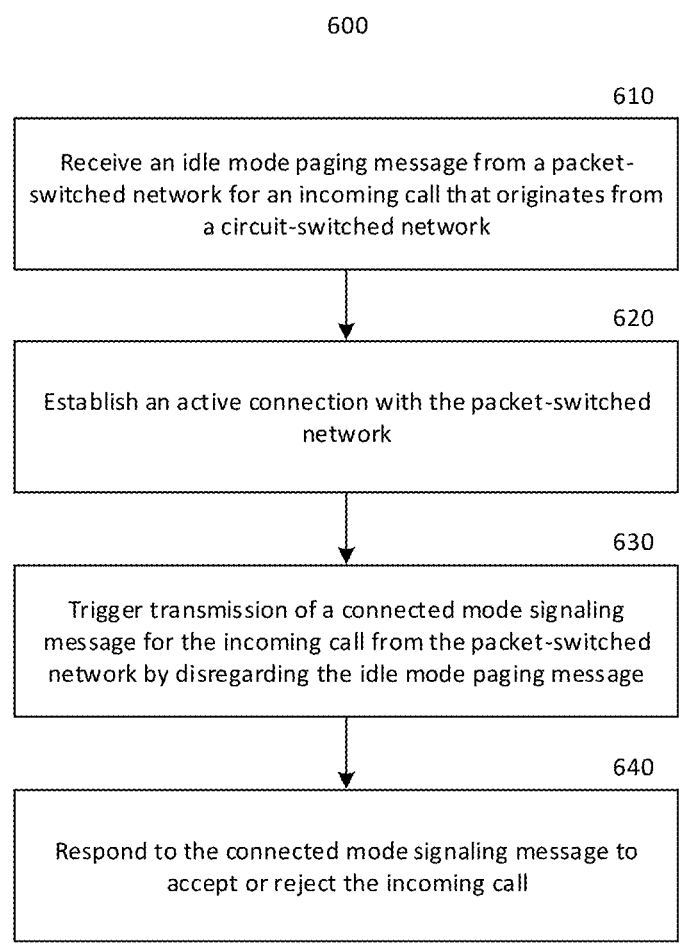
FIG. 6 shows a second method of performing radio communications.

FIG. 6 shows method 600 for performing radio communications in accordance with this disclosure. As shown in FIG. 6, method 600 includes receiving an idle mode paging message from a packet-switched network for an incoming call that originates from a circuit-switched network (610), establishing an active connection with the packet-switched network (620), triggering transmission of a connected mode signaling message for the incoming call from the packet-switched network by disregarding the idle mode paging message (630), and responding to the connected mode signaling message to accept or reject the incoming call (640).

In one or more further exemplary aspects of this disclosure, one or more of the features described above in reference to FIGS. 1-4 may be further incorporated into method 500 and/or 600. In particular, method 500 and/or 600 may be configured to perform further and/or alternate processes as detailed regarding mobile terminal 102 and/or controller 210.

The terms "user equipment", "UE", "mobile terminal", "user terminal", etc., may apply to any wireless communication device, including cellular phones, tablets, laptops, personal computers, wearables, multimedia playback and other handheld electronic devices, consumer/home/office/commercial appliances, vehicles, and any number of additional electronic devices capable of wireless communications.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

The following examples pertain to further aspects of this disclosure

Example 1 is method of performing radio communications, the method including receiving an initial call notification attempt in idle mode from a first network for an incoming call that originates from a second network, establishing an active connection with the first network, triggering a subsequent call notification attempt for the incoming call from the first network by disregarding the initial call notification attempt, and presenting a user with caller identity information for the incoming call provided in the subsequent call notification attempt.

In Example 2, the subject matter of Example 1 can optionally include wherein the first network is a packet-switched network and the second network is a circuit-switched network.

In Example 3, the subject matter of Example 1 or 2 can optionally further include accepting or rejecting the incoming call responsive to input from the user, and performing circuit-switched feedback to the second network if the incoming call is accepted.

In Example 4, the subject matter of Example 1 or 2 can optionally further include accepting or rejecting the incoming call responsive to input from the user, and switching from the first network to the second network to receive the incoming call if the incoming call is accepted.

In Example 5, the subject matter of any one of Examples 1 to 4 can optionally further include remaining on the first network if the incoming call is rejected.

In Example 6, the subject matter of Example 1 or 2 can optionally include wherein establishing the active connection with the first network includes transmitting a Service Request to the first network.

In Example 7, the subject matter of Example 6 can optionally include wherein establishing the active connection with the first network further includes performing a random access procedure and radio connection setup procedure with the first network prior to transmitting the Service Request to the first network.

In Example 8, the subject matter of Example 6 or 7 can optionally include wherein triggering the subsequent call notification attempt for the incoming call from the first network by disregarding the initial call notification attempt includes refraining from transmitting an Extended Service Request in response to the initial call notification attempt, the method further including transmitting an Extended Service Request in response to the subsequent call notification attempt to accept or reject the incoming call.

In Example 9, the subject matter of Example 8 can optionally include wherein transmitting the Extended Service Request in response to the subsequent call notification attempt to accept or reject the incoming call includes transmitting an affirmative Extended Service Request in response to the subsequent call notification attempt if the incoming call is accepted, and transmitting a negative Extended Service Request in response to the subsequent call notification attempt if the incoming call is declined.

In Example 10, the subject matter of Example 8 or 9 can optionally further include switching from the first network to the second network to receive the incoming call if the incoming call is accepted.

In Example 11, the subject matter of Example 8 or 9 can optionally further include performing circuit-switched feedback to the second network to receive the incoming call if the incoming call is accepted.

In Example 12, the subject matter of any one of Examples 1 to 11 can optionally further include receiving the subsequent call notification attempt for the incoming call from the first network in connected mode after establishing the active connection with the first network.

In Example 13, the subject matter of any one of Examples 1 to 12 can optionally include wherein the initial call notification attempt is an idle mode paging message and the subsequent call notification attempt is a connected mode signaling message.

In Example 14, the subject matter of any one of Examples 1 to 13 can optionally include wherein the subsequent call notification attempt is a circuit-switched (CS) service notification message.

In Example 15, the subject matter of Example 14 can optionally include wherein the caller identity information is Calling Line Identification (CLI).

In Example 16, the subject matter of any one of Examples 1 to 14 can optionally include wherein the initial call notification attempt is an Access Stratum (AS) message and the subsequent call notification attempt is a non-Access Stratum (NAS) message.

In Example 17, the subject matter of any one of Examples 1 to 16 can optionally include wherein the incoming call is a circuit-switched call.

In Example 18, the subject matter of any one of Examples 1 to 16 can optionally include wherein the first network is a Long Term Evolution (LTE) network and the second network is one of a Global System for Mobile Communications (GSM) network or a Universal Mobile Telecommunications System (UMTS) network.

In Example 19, the subject matter of any one of Examples 1 to 18 can optionally include wherein establishing the active connection with the first network includes establishing an active Access Stratum (AS) connection and an active non-Access Stratum (NAS) connection with the first network.

In Example 20, the subject matter of Example 19 can optionally include wherein the AS connection is a Radio Resource Control (RRC) connection and the NAS connection is an Evolved Packet System (EPS) Mobility Management (EMM) connection.

Example 21 is a control circuit configured to perform the method of any one of Examples 1 to 20.

Example 22 is a communication device configured to perform the method of any one of Examples 1 to 20.

Example 23 is a non-transitory computer readable medium storing instructions that when executed by a controller of a communication device direct the communication device to perform the method of any one of Examples 1 to 20.

Example 24 is a non-transitory computer readable medium storing instructions that when executed by a processor direct the processor to perform the method of any one of Examples 1 to 20.

Example 25 is a method of performing radio communications, the method including receiving an idle mode paging message from a packet-switched network for an incoming call that originates from a circuit-switched network, establishing an active connection with the packet-switched network, triggering transmission of a connected mode signaling message for the incoming call from the packet-switched network by disregarding the idle mode paging message, and responding to the connected mode signaling message to accept or reject the incoming call.

In Example 26, the subject matter of Example 25 can optionally further include presenting a user with caller identity information for the incoming call provided in the connected mode signaling message, wherein responding to the connected mode signaling message to accept or reject the incoming call includes accepting or rejecting the incoming call responsive to input from the user.

In Example 27, the subject matter of Example 25 or 26 can optionally include wherein the connected mode signaling message is a circuit-switched (CS) service notification message.

In Example 28, the subject matter of Example 26 or 27 can optionally include wherein the caller identity information is Calling Line Identification (CLI).

In Example 29, the subject matter of any one of Examples 25 to 28 can optionally further include performing circuit-switched feedback to the circuit-switched network if the incoming call is accepted.

In Example 30, the subject matter of any one of Examples 25 to 28 can optionally further include switching from the packet-switched network to the circuit-switched network to receive the incoming call if the incoming call is accepted.

In Example 31, the subject matter of any one of Examples 25 to 30 can optionally further include remaining on the packet-switched network if the incoming call is rejected.

In Example 32, the subject matter of Example 25 can optionally include wherein establishing the active connection with the packet-switched network includes transmitting a Service Request to the packet-switched network.

In Example 33, the subject matter of Example 32 can optionally include wherein establishing the active connection with the packet-switched network further includes performing a random access procedure and radio connection setup procedure with the packet-switched network prior to transmitting the Service Request to the packet-switched network.

In Example 34, the subject matter of Example 32 or 33 can optionally include wherein triggering transmission of the connected mode signaling message for the incoming call from the packet-switched network by disregarding the idle mode paging message includes refraining from transmitting an Extended Service Request in response to the idle mode paging message, and wherein responding to the connected mode signaling message to accept or reject the incoming call includes transmitting an Extended Service Request in response to the connected mode signaling message to accept or reject the incoming call.

In Example 35, the subject matter of Example 34 can optionally include wherein transmitting the Extended Service Request in response to the connected mode signaling message to accept or reject the incoming call includes transmitting an affirmative Extended Service Request in response to the connected mode signaling message to accept the call or transmitting a negative Extended Service Request in response to the connected mode signaling message to reject the call.

In Example 36, the subject matter of Example 34 or 35 can optionally further include switching from the packet-switched network to the circuit-switched network to receive the incoming call if the incoming call is accepted.

In Example 7, the subject matter of Example 34 or 35 can optionally further include performing circuit-switched feedback to the circuit-switched network to receive the incoming call if the incoming call is accepted.

In Example 38, the subject matter of any one of Examples 25 to 31 can optionally further include receiving the connected mode signaling message from the packet-switched network by ignoring the idle mode paging message after establishing the active connection with the packet-switched network.

In Example 39, the subject matter of any one of Examples 25 to 38 can optionally include wherein the idle mode paging message is an Access Stratum (AS) message and the connected mode signaling message is a non-Access Stratum (NAS) message.

In Example 40, the subject matter of any one of Examples 25 to 39 can optionally include wherein the incoming call is a circuit-switched call.

In Example 41, the subject matter of any one of Examples 25 to 40 can optionally include wherein the packet-switched network is a Long Term Evolution (LTE) network and the circuit-switched network is one of a Global System for Mobile Communications (GSM) network or a Universal Mobile Telecommunications System (UMTS) network.

In Example 42, the subject matter of any one of Examples 25 to 41 can optionally include wherein establishing the active connection with the packet-switched network includes establishing an active Access Stratum (AS) connection and an active non-Access Stratum (NAS) connection with the packet-switched network.

In Example 43, the subject matter of Example 42 can optionally include wherein the AS connection is a Radio Resource Control (RRC) connection and the NAS connection is an Evolved Packet System (EPS) Mobility Management (EMM) connection.

Example 44 is a control circuit configured to perform the method of any one of Examples 25 to 43.

Example 45 is a communication device configured to perform the method of any one of Examples 25 to 43.

Example 46 is a non-transitory computer readable medium storing instructions that when executed by a controller of a communication device direct the communication device to perform the method of any one of Examples 25 to 43.

Example 47 is a non-transitory computer readable medium storing instructions that when executed by a processor direct the processor to perform the method of any one of Examples 25 to 43.

Example 48 is a communication circuit arrangement including a control circuit configured to receive an initial call notification attempt in idle mode from a first network for an incoming call that originates from a second network, establish an active connection with the first network, trigger a subsequent call notification attempt from the incoming call from the first network by disregarding the initial call notification attempt, and presenting a user with caller identity information for the incoming call provided in the subsequent call notification attempt.

In Example 49, the subject matter of Example 48 can optionally be configured as a radio communication device and further including a radio transceiver configured to interact with the control circuit to transmit and receive radio communication signals.

In Example 50, the subject matter of Example 49 can optionally further include a baseband modem that includes the control circuit.

In Example 51, the subject matter of Example 49 or 50 can optionally further include an antenna system.

In Example 52, the subject matter of any one of Examples 48 to 51 can optionally include wherein the control circuit is configured to operate in accordance with protocol stack software control logic.

In Example 53, the subject matter of any one of Examples 48 to 52 can optionally include wherein the first network is a packet-switched network and the second network is a circuit-switched network.

In Example 54, the subject matter of any one of Examples 48 to 53 can optionally include wherein the control circuit is further configured to accept or reject the incoming call responsive to input from the user, and perform circuit-switched feedback to the second network if the incoming call is accepted.

In Example 55, the subject matter of any one of Examples 48 to 53 can optionally include wherein the control circuit is further configured to accept or rejecting the incoming call responsive to input from the user, and switch from the first network to the second network to receive the incoming call if the incoming call is accepted.

In Example 6, the subject matter of any one of Examples 48 to 55 can optionally include wherein the control circuit is further configured to remain on the first network if the incoming call is rejected.

In Example 57, the subject matter of any one of Examples 48 to 53 can optionally include wherein the control circuit is configured to establish the active connection with the first network by transmitting a Service Request to the first network.

In Example 58, the subject matter of Example 57 can optionally include wherein the control circuit is further configured to establish the active connection with the first network by performing a random access procedure and radio connection setup procedure with the first network prior to transmitting the Service Request to the first network.

In Example 59, the subject matter of Example 57 or 58 can optionally include wherein the control circuit is configured to trigger the subsequent call notification attempt for the incoming call from the first network by disregarding the initial call notification attempt includes refraining from transmitting an Extended Service Request in response to the initial call notification attempt, the control circuit further configured to transmit an Extended Service Request in response to the subsequent call notification attempt to accept or reject the incoming call.

In Example 60, the subject matter of Example 59 can optionally include wherein the control circuit is configured to transmit the Extended Service Request in response to the subsequent call notification attempt to accept or reject the incoming call by transmitting an affirmative Extended Service Request in response to the subsequent call notification attempt if incoming call is accepted, and transmitting a negative Extended Service Request in response to the subsequent call notification attempt if the incoming call is declined.

In Example 1, the subject matter of Example 59 or 60 can optionally include wherein the control circuit is further configured to switch from the first network to the second network to receive the incoming call if the incoming call is accepted.

In Example 2, the subject matter of Example 59 or 60 can optionally include wherein the control circuit is further configured to perform circuit-switched feedback to the second network to receive the incoming call if the incoming call is accepted.

In Example 63, the subject matter of any one of Examples 48 to 62 can optionally include wherein the control circuit is further configured to receive the subsequent call notification attempt for the incoming call from the first network in connected mode after establishing the active connection with the first network.

In Example 64, the subject matter of any one of Examples 48 to 63 can optionally include wherein the initial call notification attempt is an idle mode paging message and the subsequent call notification attempt is a connected mode signaling message.

In Example 65, the subject matter of any one of Examples 48 to 63 can optionally include wherein the subsequent call notification attempt is a circuit-switched (CS) service notification message.

In Example 66, the subject matter of Example 65 can optionally include wherein the caller identity information is Calling Line Identification (CLI).

In Example 67, the subject matter of any one of Examples 48 to 66 can optionally include wherein the initial call notification attempt is an Access Stratum (AS) message and the subsequent call notification attempt is a non-Access Stratum (NAS) message.

In Example 68, the subject matter of any one of Examples 48 to 67 can optionally include wherein the incoming call is a circuit-switched call.

In Example 69, the subject matter of any one of Examples 48 to 68 can optionally include wherein the first network is a Long Term Evolution (LTE) network and the second network is one of a Global System for Mobile Communications (GSM) network or a Universal Mobile Telecommunications System (UMTS) network.

In Example 70, the subject matter of any one of Examples 48 to 69 can optionally include wherein the control circuit is configured to establish the active connection with the first network by establishing an active Access Stratum (AS) connection and an active non-Access Stratum (NAS) connection with the first network.

In Example 71, the subject matter of Example 70 can optionally include wherein the AS connection is a Radio Resource Control (RRC) connection and the NAS connection is an Evolved Packet System (EPS) Mobility Management (EMM) connection.

Example 72 is a communication circuit arrangement including a control circuit configured to receive an idle mode paging message from a packet-switched network for an incoming call that originates from a circuit-switched network, establish an active connection with the packet-switched network, trigger transmission of a connected mode signaling message for the incoming call from the packet-switched network by disregarding the idle mode paging message, and respond to the connected mode signaling message to accept or reject the incoming call.

In Example 73, the subject matter of Example 72 can optionally be configured as a radio communication device and further including a radio transceiver configured to interact with the control circuit to transmit and receive radio communication signals.

In Example 74, the subject matter of Example 73 can optionally further include a baseband modem that includes the control circuit.

In Example 75, the subject matter of Example 73 or 74 can optionally further include an antenna system.

In Example 76, the subject matter of any one of Examples 73 to 75 can optionally include wherein the control circuit is configured to operate in accordance with protocol stack software control logic.

In Example 77, the subject matter of any one of Examples 72 to 76 can optionally include wherein the control circuit is further configured to present a user with caller identity information for the incoming call provided in the connected mode signaling message, wherein the control circuit is configured to respond to the connected mode signaling message to accept or reject the incoming call by accepting or rejecting the incoming call responsive to input from the user.

In Example 78, the subject matter of any one of Examples 72 to 77 can optionally include wherein the connected mode signaling message is a circuit-switched (CS) service notification message.

In Example 79, the subject matter of Example 77 or 78 can optionally include wherein the caller identity information is Calling Line Identification (CLI).

In Example 80, the subject matter of any one of Examples 72 to 79 can optionally include wherein the control circuit is further configured to perform circuit-switched feedback to the circuit-switched network if the incoming call is accepted.

In Example 81, the subject matter of any one of Examples 72 to 80 can optionally include wherein the control circuit is further configured to switch from the packet-switched network to the circuit-switched network to receive the incoming call if the incoming call is accepted.

In Example 82, the subject matter of any one of Examples 72 to 81 can optionally include wherein the control circuit is further configured to remain on the packet-switched network if the incoming call is rejected.

In Example 83, the subject matter of any one of Examples 72 to 76 can optionally include wherein the control circuit is further configured to establish the active connection with the packet-switched network by transmitting a Service Request to the packet-switched network.

In Example 84, the subject matter of Example 83 can optionally include wherein the control circuit is further configured to establish the active connection with the packet-switched network by performing a random access procedure and radio connection setup procedure with the packet-switched network prior to transmitting the Service Request to the packet-switched network.

In Example 85, the subject matter of Example 83 or 84 can optionally include wherein the control circuit is configured to trigger transmission of the connected mode signaling message for the incoming call from the packet-switched network by disregarding the idle mode paging message by refraining from transmitting an Extended Service Request in response to the idle mode paging message, and wherein the control circuit is configured to respond to the connected mode signaling message to accept or reject the incoming call includes transmitting an Extended Service Request in response to the connected mode signaling message to accept or reject the incoming call.

In Example 86, the subject matter of Example 85 can optionally include wherein the control circuit is configured to transmit the Extended Service Request in response to the connected mode signaling message to accept or reject the incoming call by transmitting an affirmative Extended Service Request in response to the connected mode signaling message to accept the call or transmitting a negative Extended Service Request in response to the connected mode signaling message to reject the call.

In Example 87, the subject matter of Example 85 or 86 can optionally include wherein the control circuit is further configured to switch from the packet-switched network to the circuit-switched network to receive the incoming call if the incoming call is accepted.

In Example 88, the subject matter of Example 85 or 86 can optionally include wherein the control circuit is further configured to perform circuit-switched feedback to the circuit-switched network to receive the incoming call if the incoming call is accepted.

In Example 89, the subject matter of any one of Examples 72 to 82 can optionally include wherein the control circuit is further configured to receive the connected mode signaling message from the packet-switched network by ignoring the idle mode paging message after establishing the active connection with the packet-switched network.

In Example 90, the subject matter of any one of Examples 72 to 89 can optionally include wherein the idle mode paging message is an Access Stratum (AS) message and the connected mode signaling message is a non-Access Stratum (NAS) message.

In Example 91, the subject matter of any one of Examples 72 to 90 can optionally include wherein the incoming call is a circuit-switched call.

In Example 92, the subject matter of any one of Examples 72 to 91 can optionally include wherein the packet-switched network is a Long Term Evolution (LTE) network and the circuit-switched network is one of a Global System for Mobile Communications (GSM) network or a Universal Mobile Telecommunications System (UMTS) network.

In Example 93, the subject matter of any one of Examples 72 to 92 can optionally include wherein the control circuit is configured establish the active connection with the packet-switched network by establishing an active Access Stratum (AS) connection and an active non-Access Stratum (NAS) connection with the packet-switched network.

In Example 94, the subject matter of Example 93 can optionally include wherein the AS connection is a Radio Resource Control (RRC) connection and the NAS connection is an Evolved Packet System (EPS) Mobility Management (EMM) connection.

Example 95 is a non-transitory computer readable medium storing instructions that when executed by a controller of a radio communication device direct the radio communication device to perform a method including receiving an initial call notification attempt in idle mode from a first network for an incoming call that originates from a second network, establishing an active connection with the first network, triggering a subsequent call notification attempt for the incoming call from the first network by disregarding the initial call notification attempt, and presenting a user with caller identity information for the incoming call provided in the subsequent call notification attempt.

In Example 96, the subject matter of Example 95 can optionally include wherein the first network is a packet-switched network and the second network is a circuit-switched network.

In Example 97, the subject matter of Example 95 or 96 can optionally include the method further including accepting or rejecting the incoming call responsive to input from the user, and performing circuit-switched feedback to the second network if the incoming call is accepted.

In Example 98, the subject matter of Example 95 or 96 can optionally include the method further including accepting or rejecting the incoming call responsive to input from the user, and switching from the first network to the second network to receive the incoming call if the incoming call is accepted.

In Example 99, the subject matter of any one of Examples 95 to 98 can optionally include the method further including remaining on the first network if the incoming call is rejected.

In Example 100, the subject matter of Example 95 or 96 can optionally include wherein establishing the active connection with the first network includes transmitting a Service Request to the first network.

In Example 101, the subject matter of Example 100 can optionally include wherein establishing the active connection with the first network further includes performing a random access procedure and radio connection setup procedure with the first network prior to transmitting the Service Request to the first network.

In Example 102, the subject matter of Example 100 or 101 can optionally include wherein triggering the subsequent call notification attempt for the incoming call from the first network by disregarding the initial call notification attempt includes refraining from transmitting an Extended Service Request in response to the initial call notification attempt, the method further including transmitting an Extended Service Request in response to the subsequent call notification attempt to accept or reject the incoming call.

In Example 103, the subject matter of Example 102 can optionally include wherein transmitting the Extended Service Request in response to the subsequent call notification attempt to accept or reject the incoming call includes transmitting an affirmative Extended Service Request in response to the subsequent call notification attempt if the incoming call is accepted, and transmitting a negative Extended Service Request in response to the subsequent call notification attempt if the incoming call is declined.

In Example 104, the subject matter of Example 102 or 103 can optionally include the method further including switching from the first network to the second network to receive the incoming call if the incoming call is accepted.

In Example 105, the subject matter of Example 102 or 103 can optionally include the method further including performing circuit-switched feedback to the second network to receive the incoming call if the incoming call is accepted.

In Example 106, the subject matter of any one of Examples 95 to 105 can optionally include the method further including receiving the subsequent call notification attempt for the incoming call from the first network in connected mode after establishing the active connection with the first network.

In Example 107, the subject matter of any one of Examples 95 to 106 can optionally include wherein the initial call notification attempt is an idle mode paging message and the subsequent call notification attempt is a connected mode signaling message.

In Example 108, the subject matter of any one of Examples 95 to 107 can optionally include wherein the subsequent call notification attempt is a circuit-switched (CS) service notification message.

In Example 109, the subject matter of Example 108 can optionally include wherein the caller identity information is Calling Line Identification (CLI).

In Example 110, the subject matter of any one of Examples 95 to 109 can optionally include wherein the initial call notification attempt is an Access Stratum (AS) message and the subsequent call notification attempt is a non-Access Stratum (NAS) message.

In Example 111, the subject matter of any one of Examples 95 to 110 can optionally include wherein the incoming call is a circuit-switched call.

In Example 112, the subject matter of any one of Examples 95 to 111 can optionally include wherein the first network is a Long Term Evolution (LTE) network and the second network is one of a Global System for Mobile Communications (GSM) network or a Universal Mobile Telecommunications System (UMTS) network.

In Example 113, the subject matter of any one of Examples 95 to 112 can optionally include wherein establishing the active connection with the first network includes establishing an active Access Stratum (AS) connection and an active non-Access Stratum (NAS) connection with the first network.

In Example 114, the subject matter of Example 113 can optionally include wherein the AS connection is a Radio Resource Control (RRC) connection and the NAS connection is an Evolved Packet System (EPS) Mobility Management (EMM) connection.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication circuit arrangement comprising:
   a control circuit configured to:
   receive an initial call notification attempt in idle mode from a first network; for an incoming call that originates from a second network;
   establish an active connection with the first network;
   trigger a subsequent call notification attempt from the incoming call from the first network by disregarding the initial call notification attempt; wherein the subsequent call notification attempt is a non-Access Stratum (NAS) message provided by a mobility management entity (MME);
   present a user with caller identity information for the incoming call provided in the subsequent call notification attempt;
   receive input from a user to accept or decline the incoming call based on the caller identity information; and
   respond to the subsequent call notification attempt to accept or decline the incoming call; wherein the response is based on the received input from the user.

2. The communication circuit arrangement of claim 1, configured as a radio communication device and further comprising a radio transceiver configured to interact with the control circuit to transmit and receive radio communication signals.

3. The communication circuit arrangement of claim 1, wherein the first network is a packet-switched network and the second network is a circuit-switched network.

4. The communication circuit arrangement of claim 1, wherein the control circuit is further configured to:
   accept or reject the incoming call responsive to input from the user; and
   perform circuit-switched feedback to the second network if the incoming call is accepted.

5. The communication circuit arrangement of claim 1, wherein the control circuit is configured to establish the active connection with the first network by:
   transmitting a Service Request to the first network.

6. The communication circuit arrangement of claim 1, wherein the control circuit is configured to respond to the subsequent call notification attempt to accept or decline the incoming call by:
   refraining from transmitting an Extended Service Request in response to the initial call notification attempt, or
   transmitting an Extended Service Request in response to the subsequent call notification attempt to accept or reject the incoming call.

7. The communication circuit arrangement of claim 6, wherein the transmitting the Extended Service Request in response to the subsequent call notification attempt to accept or reject the incoming call by:
   transmitting an affirmative Extended Service Request in response to the subsequent call notification attempt if incoming call is accepted; and
   transmitting a negative Extended Service Request in response to the subsequent call notification attempt if the incoming call is declined.

8. The communication circuit arrangement of claim 1, wherein the subsequent call notification attempt is a circuit-switched (CS) service notification message.

9. The communication circuit arrangement of claim 8, wherein the caller identity information is Calling Line Identification (CLI).

10. The communication circuit arrangement of claim 1, wherein the initial call notification attempt is an Access Stratum (AS) message.

11. A communication circuit arrangement comprising:
    a control circuit configured to:
    receive an idle mode paging message from a packet-switched network for an incoming call that originates from a circuit-switched network;
    establish an active connection with the packet-switched network;
    trigger transmission of a connected mode signaling message for the incoming call from the packet-switched network by disregarding the idle mode paging message; wherein the connected mode signaling message is a non-Access Stratum (NAS) message provided by a mobility management entity (MME);
    receive input from a user to accept or reject the incoming call; and
    respond to the connected mode signaling message; wherein the response is based on the received input from the user.

12. The communication circuit arrangement of claim 11, wherein the control circuit is further configured to present a user with caller identity information for the incoming call provided in the connected mode signaling message,
    wherein the control circuit is configured to respond to the connected mode signaling message to accept or reject the incoming call by:
    accepting or rejecting the incoming call responsive to input from the user.

13. The communication circuit arrangement of claim 11, wherein the connected mode signaling message is a circuit-switched (CS) service notification message.

14. The communication circuit arrangement of claim 11, wherein the control circuit is further configured to:
    perform circuit-switched feedback to the circuit-switched network if the incoming call is accepted.

15. The communication circuit arrangement of claim 11, wherein the control circuit is configured to respond to the connected mode signaling message by:
    transmitting an Extended Service Request in response to the connected mode signaling message to accept or reject the incoming call.

16. A non-transitory computer readable medium storing instructions that when executed by a controller of a radio communication device direct the radio communication device to perform a method comprising:
    receiving an initial call notification attempt in idle mode from a first network for an incoming call that originates from a second network;
    establishing an active connection with the first network;

triggering a subsequent call notification attempt for the incoming call from the first network by disregarding the initial call notification attempt; wherein the subsequent call notification attempt is a non-Access Stratum (NAS) message provided by a mobility management entity (MME);

presenting a user with caller identity information for the incoming call provided in the subsequent call notification attempt;

receiving input from a user to accept or decline the incoming call; and responding to the subsequent call notification attempt to accept or decline the incoming call; wherein the response is based on the received input from the user.

17. The non-transitory computer readable medium of claim 16, wherein the first network is a packet-switched network and the second network is a circuit-switched network.

18. The non-transitory computer readable medium of claim 16, the method further comprising:
accepting or rejecting the incoming call responsive to input from the user; and
performing circuit-switched feedback to the second network if the incoming call is accepted.

19. The non-transitory computer readable medium of claim 16, wherein triggering the subsequent call notification attempt for the incoming call from the first network by disregarding the initial call notification attempt comprises:
refraining from transmitting an Extended Service Request in response to the initial call notification attempt,
the method further comprising transmitting an Extended Service Request in response to the subsequent call notification attempt to accept or reject the incoming call.

20. The non-transitory computer readable medium of claim 16, wherein the subsequent call notification attempt is a circuit-switched (CS) service notification message.

21. The non-transitory computer readable medium of claim 16, wherein the initial call notification attempt is an Access Stratum (AS) message.

22. A method of performing radio communications, the method comprising:
receiving an initial call notification attempt in idle mode from a first network for an incoming call that originates from a second network;
establishing an active connection with the first network;
triggering a subsequent call notification attempt for the incoming call from the first network by disregarding the initial call notification attempt; wherein the subsequent call notification attempt is a non-Access Stratum (NAS) message provided by a mobility management entity (MME);
presenting a user with caller identity information for the incoming call provided in the subsequent call notification attempt;
receiving input from a user to accept or decline the incoming call; and
responding to the subsequent call notification attempt to accept or decline the incoming call; wherein the response is based on the received input from the user.

23. The method of claim 22, wherein the first network is a packet-switched network and the second network is a circuit-switched network.

24. The method of claim 22, wherein responding to the subsequent call notification attempt comprises:
transmitting an Extended Service Request in response to the subsequent call notification attempt to accept or reject the incoming call.

25. The method of claim 22, wherein the initial call notification attempt is an Access Stratum (AS) message.

* * * * *